July 3, 1934.  C. O. COZZENS  1,964,811
OPHTHALMIC MOUNTING
Filed Jan. 4, 1930
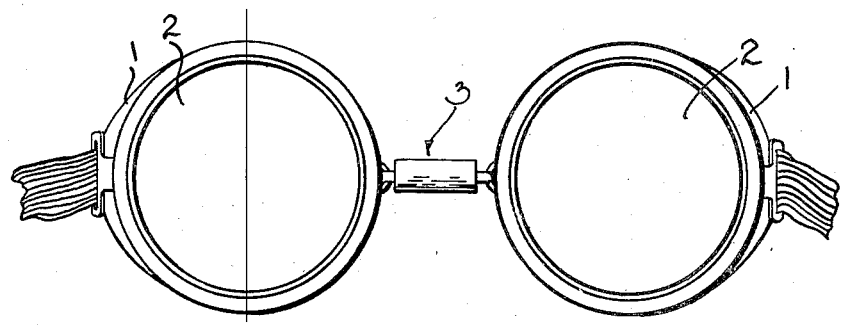
FIG. I
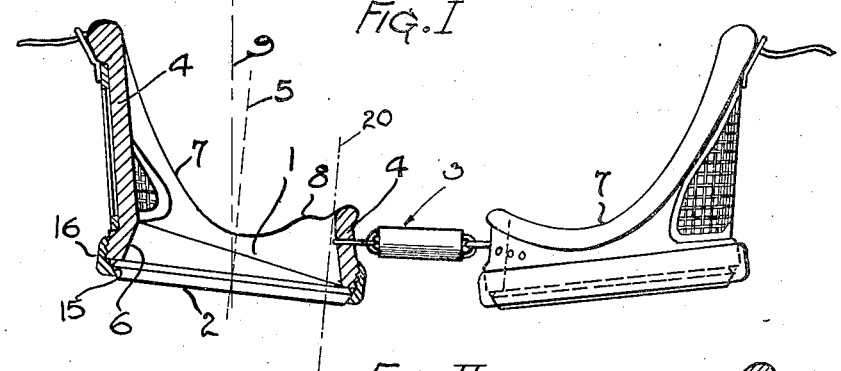
FIG. II
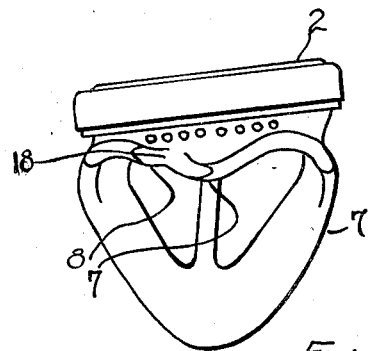
FIG. III
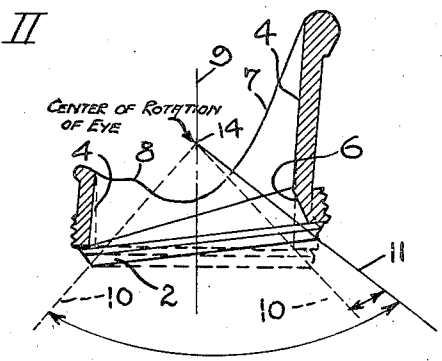
FIG. IV
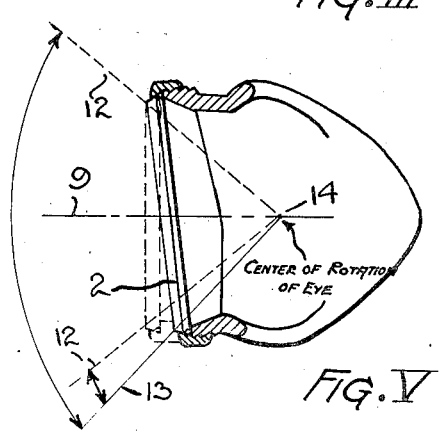
FIG. V
INVENTOR
CHARLES O. COZZENS
BY Harry H. Styll
ATTORNEY Patented July 3, 1934

1,964,811

UNITED STATES PATENT OFFICE 1,964,811

OPHTHALMIC MOUNTING

Charles O. Cozzens, Southbridge, Mass., assignor to American Optical Company, Southbridge, Mass., a voluntary association of Massachusetts Application January 4, 1930, Serial No. 418,569

2 Claims. (Cl. 2—14)

This invention relates to improvements in ophthalmic mountings and has particular reference to an improved type of mounting for use in eye-protection.

The principal object of this invention is to provide an eye-protector which will allow a wide angle of vision in all directions while providing complete protection.

Another object of this invention is to so construct the improved eye-protector that the increased field of vision may be obtained without unduly increasing the face contacting area of the eye cups and overheating the wearer's face.

Another object of the invention is to provide simple means for constructing the eye-protector with an increased field of vision so that it may be manufactured in an economical and efficient manner.

Another object of the invention is to provide means to allow the eye-protector to be worn for long periods of time without discomfort, such means including improved face contacting edges which conform snugly to the facial contour.

Other objects and advantages will become apparent from the following description taken in connection with the accompanying drawing, and it will be understood that many changes may be made in the details of construction and arrangement of parts without departing from the spirit of the invention as expressed in the accompanying claims. I, therefore, do not wish to be limited to the exact details shown and described as the preferred forms only have been shown by way of illustration.

In the drawing:

Fig. I is a front view of a pair of eye protectors embodying the invention.

Fig. II is a top or plan view of the eye protectors with one eye cup in section.

Fig. III is an end view of one eye cup looking from the nasal side.

Fig. IV is a diagrammatic view illustrating one of the features of the invention.

Fig. V is a diagrammatic view illustrating another feature of the invention.

The usual type of eye protector now in general use for welding, chipping and other industrial occupations has cup-shaped lens holders fitting around the wearer's eyes and projecting outwardly therefrom. Owing to the projecting cup the field of vision is naturally reduced and as it is necessary to keep the size and thickness of the cup within certain limits to prevent over-heating the wearer's face it will readily be seen that this reduction in the field of vision may be quite large.

Prior art eye protectors had a cylindrically shaped cup with the lens positioned normal to the axis of the cup. This construction, therefore, kept the field of vision within the same restricted area as set by the cylindrical eye cup, as will be apparent.

In my invention I have departed from this construction and provided simple means to enlarge the field of vision considerably and at the same time improved other disadvantages of prior constructions.

One of the novel and important features of the invention is to overcome the restriction of the visual field, such as is found in prior art eye protectors and provide a wide angle of vision so that the wearer will not be constantly moving his head from place to place unnecessarily.

Another novel and important feature of the invention is to combine the enlarged field of vision with means to increase the comfort of the eye protector when worn for long periods of time. It has been apparent that the conventional cylindrical eyecups of the prior art are not constructed with any means of reducing the pressure and embedding effect of the eyecup edge against the wearer's face and that no provision has been made to allow the eyecup to lie against the less tender parts of the wearer's face and avoid the sensitive portions. This discomfort has incidentally been the cause of many accidents inasmuch as the workman would often remove his eye protectors because of the irritation caused thereby and so expose his unprotected eyes to the hazards that the wearing of the protectors would eliminate.

I have, therefore, enlarged the field of vision and at the same time provided an eye protector in which a novel face contacting portion reduces the usual discomfort, maintains the eyecups in correct alignment and provides every inducement for the wearer to retain the eye protectors in position during his employment on hazardous tasks.

Referring to the drawing wherein similar characters of reference denote corresponding parts throughout the several views, the improved eye protector consists broadly of a pair of eye cups 1 carrying the lenses 2 and joined together with an adjustable bridge 3.

In forming the eye cups 1, I depart from the usual plain cylindrical shaped cups of prior practice and mold or otherwise shape my eye cups 1 of fiber or other suitable material to obtain a wider field of vision than has heretofore been possible.

I form the sides 4 to lie at an angle to the line 9 of straight ahead vision as shown in Fig. II and also shape the face contacting edge 7 so that the lenses 2 will lie at an angle to a line normal to the axis of the cups 1 or at an angle from the nasal to the temporal sides and not normal to the line 9 of straight ahead vision. In Fig. II it will be seen that the axis 5 of the lenses 2 forms an acute angle with the said line of straight ahead vision.

A novel feature of my invention will now be apparent. The sides 4, as stated, are inclined with regard to the line 9 of straight-ahead vision. In this regard it will be appreciated that if I merely shaped the cups 1 to bring the lenses 2 at an angle, but left the sides 4 normal to the lenses, my invention of increasing the field of vision would be defeated. This may clearly be seen from Fig. II where the line 20 at the nasal side is drawn parallel to the axis 5 of the lens 2 or normal to the lens. If the side 4 of the cup were left thus an appreciable angle of useful vision at the nasal side would be cut off and I, therefore, have provided the inclined sides 4 to overcome this drawback.

In Fig. IV I have shown diagrammatically the effect of so shaping my eyecup and the improvement in the area of the field of vision obtained thereby. The line 9 of straight ahead vision was heretofore normal to the lens as shown in dotted lines but in my improved construction the lens 2 shown in full lines is at an angle thereto. The sides 4 of the eyecups 1 are not normal to the lens 2 and have a cone shaped portion 6 blending into the angled cylinder shape 4 of the lower portion of the cup 1. The cone shaped portion 6 is placed at such an angle that it has preferably its greatest surface opposite the temporal edge of the eyecups 1 and disappears at the nasal side as will be apparent from the drawing. From this construction a much larger field of vision is obtained and this is shown diagrammatically in Fig. IV where the dotted lines 10 represent the extent of the field of vision of the prior art and the full line 11 represents the increase in this field. It will be apparent that a wide portion of wearers' field was cut off by the prior art constructions and this has been remedied by novel means in my construction. The center of rotation of the eye 14 is placed approximately twenty millimeters from the rear surface of the lens 2 but this may of course be varied.

Together with the increased field at the temporal side I have also increased the field of vision in a downwards direction. It will be apparent that this increase in the visual field is important inasmuch as the usual welding or chipping operations are usually carried out with the head of the wearer in a bent position and due to my improved eyecup the position of the wearer's head may be varied far more than in the prior art and relieve the strain on the wearer considerably. It will be apparent that the eyes may be moved in lieu of the head if desired as the improved form of eyecup does not cut off the lower portion of the field as did the prior types which made moving the head a necessity if sight of an object lower down was desired.

I therefore mold my improved eyecup 1 with a shorter length at the lower side than at the upper as shown in Fig. V. The lens 2 is therefore held at an angle to the line 9 of straight ahead vision and off the head is at an angle to a line normal to the axis of the cup 1 and is not normal thereto as was usual in the prior art lens (shown in dotted lines). It will be observed that the cheek fitting or lower portion of the eyecup is shorter than the forehead fitting or upper edge to obtain this angle and that the cone portion 6 is equally divided at these points while being lower at the temporal side as has been described. The dotted lines 12 in this view show the extent of prior art vision at the lower side while the full line 13 shows the improved and enlarged field.

The face-contacting edge 7 of the eyecup 1 is preferably shaped to fit closely to the wearer's face and has a contour shaped for this purpose with a projecting portion 17 designed to fit snugly in the nasal depression or canthus of the eye. The temporal portion is so shaped that it conforms to the slope of the cheek-bone and does not cut into the wearer's head as did the practically unshaped cups of the prior art. The contacting edge 7 is made small enough to prevent overheating the wearer's face but well-rounded and shaped to be comfortable during continuous wear.

In Fig. III, I have shown the nasal side with the improved contacting edge. A right-hand eyecup is illustrated and it will be understood that a left-hand cup would require a reversal of the contour 7. The edge 7 is beaded as shown and at the nasal side has a projecting portion 17 to fit closely against the canthus of the eye. A second projection 8 is provided adjacent the first to fit into the depression in the bony structure surrounding the orbital cavity. Between these two projections the contour of the edge 7 is curved to saddle the bridge of the nose and a flattened portion 18 rests against the said bridge. By flattening this beaded edge the eyecup is allowed to rest closer to the center of the head and thus increases the visual field at this point. From the second projection 8 a smooth beaded edge extends to the temporal side around the orbital cavity and then over the frontal bone to the canthus again. It will be apparent that the inclination of the nasal side 4 to the line 9 of straight ahead vision is assisted in increasing the field of vision at the nasal side by the flatted portion 18 of the beaded edge allowing the eyecup to lie much closer over towards the center of the head. If the eyecup were not angled and not flatted at this point it would be apparent that the nasal field of vision would be greatly hampered as the bridge of the nose would push the cup outwardly towards the temporal side and the straight side would be visible.

I have found that the contour shape thus provided with the projections 17 and 8 and the flatted portion 18 enables the eyecups to be worn for long periods of time without discomfort. It is well known that the bony structure surrounding the orbital cavity is comparatively smooth and continuous until the nasal portion is reached and then the smooth contour is broken up to blend with the nasal bone. In my invention I have provided means to overcome the discomfort experienced when wearing an unshaped eyecup and have provided an edge contour which conforms to the anatomy of the orbit in such a way as to render constant removal of the eye protector unnecessary.

At the upper portion of the cups 1, I form the usual screw-thread to engage the bezel ring 16 which may also be of fiber if desired. The lens 2 is held in position by a bevel portion 15 on the bezel contacting with a suitable bevel on the edge of the lens which may be of dark colored light retarding glass. It will be apparent from this construction that lenses of any thickness may be held in position on the eye cup and that the surface may be wiped off without fear of dirt collecting in the edge of the bezel, as would be the case if the edge was not bevelled as shown but merely screwed down upon the face of the lens 2.

From the foregoing description it will be apparent that I have provided simple means to improve the various features of the eye protectors used chiefly for industrial purposes, particularly in so adapting the original parts that the improved form may be obtained without expensive additions thereto. The safety feature of the improved eye cup is much advanced over the prior type by means of the wider visual field obtained and the fatigue attendant on continuously moving the head is minimized.

Having described my invention, I claim:

1. In a device of the character described, a pair of eye cups, one to the right hand, and the other to the left and each fitted to the contour of the face surrounding the eyes, each having a seat for a lens positioned relatively close to the eye when in use, said seats each being in a plane forming within the eyecup an acute angle with the normal line of vision on the temporal side of said line, the inner walls of said eye cups being angled adjacent the lens seats to increase the field of vision when in use, horizontally and vertically, the outer edges being shaped to have edge contact with the face on the top and bottom sides, and surface contact therewith on the nasal and temporal sides, the nasal sides being shaped to fit into the nasal canthii and bear on the sides of the nose, and the outer sides to overlie the temporal canthii, substantially as shown and described.

2. In a device of the character described, a pair of eye cups, one to the right hand, and the other to the left and each fitted to the contour of the face surrounding the eyes, each having a seat for a lens positioned relatively close to the eye when in use, said seats each being in a plane forming within the cup an acute angle with the normal line of vision on the lower side of said line, the inner walls of said eye cups being angled adjacent the lens seats to increase the field of vision when in use, horizontally and vertically, the outer edges being shaped to have edge contact with the face on the top and bottom sides, and surface contact therewith on the nasal and temporal sides, the nasal sides being shaped to fit into the nasal canthii and bear on the sides of the nose, and the outer sides to overlie the temporal canthii, substantially as shown and described.

CHARLES O. COZZENS.